2,964,379

PREPARATION OF ALKALI METAL PHOSPHIDES

Eugene G. Teach and Amos J. Leffler, Lafayette, Calif., assignors to Stauffer Chemical Company, a corporation of Delaware No Drawing. Filed Apr. 2, 1958, Ser. No. 725,799

1 Claim. (Cl. 23—14)

This invention relates to a method for preparing alkali metal phosphides represented by the formula $MePH_2$, where Me designates an alkali metal.

It has heretofore been proposed to make the aforesaid phosphides by reacting metallic sodium and phosphine in liquid ammonia. However, this method has the disadvantage that the product cannot be freed of $NH_3$ which, being exceedingly reactive, presents serious difficulties in ensuing operations wherein the alkali metal phosphide (which is useful primarily as an intermediate) is converted to other compounds such as $CH_3PH_2$, $C_6H_5PH_2$ and similar organo-substituted derivatives of phosphine. Another method for preparing alkali metal phosphides known in the art is by the reaction of phosphine and a compound of the type of $(C_6H_5)_3CNa$ in ethyl ether. This is an expensive, roundabout method which again involves serious purification problems when an attempt is made to work up the desired reaction product.

Having the foregoing difficulties in mind, it is an object of this invention to provide a method for preparing alkali metal phosphides which is inexpensive and highly efficient from a yield standpoint, while at the same time affording the desired product in a form permitting of its use in many subsequent reactions without further purification. The nature of still other objects of the invention will be apparent from the following description.

It has now been discovered that the desired objects of this invention can readily be achieved in full measure by reacting phosphine with an alkali metal present in the form of a dispersion of the metal in a solvent vehicle comprising at least one liquid selected from the group consisting of hydrocarbons and ethers, said dispersion being maintained at a temperature below 50° C., and preferably below 25° C., as the sodium and phosphine are reacting therein. Particularly good results are had by employing as said vehicle a polyether having at least one terminal methoxy group since the use of an ether of this type, for reasons as yet not clearly understood, makes it possible to obtain much higher yields of the desired alkali metal phosphide than would be possible using a solvent such as xylene, toluene or dioxane, for example. However, solvents of this latter nature are otherwise satisfactory as regards a practice of this invention, and minor proportions thereof are employed in many cases along with the methoxy-polyether solvent without appreciably decreasing the product yield.

In carrying out the present method, the first step is to prepare a stable dispersion of the alkali metal which preferably is sodium, but may also be potassium, lithium or other metal of the alkali metal group. The recommended practice is to first melt the alkali metal (hereinafter designated as sodium) under an ether such as diethylene glycol dimethyl ether, thereafter allowing the mixture to cool and transferring the resulting clean (oxide-free) marbles of sodium metal to a suitable stirring device containing mineral oil, mineral spirits or other hydrocarbon or hydrocarbon mixture of a stable nature and boiling above about 105° C., i.e. high enough to melt sodium, which melts at 97.5° C. This mixture is then heated to a temperature such as 105–110° C. under an inert atmosphere, with the sodium thereafter being dispersed in finely divided form throughout the hot liquid by the action of the stirring element. On cooling, the dispersion is transferred to a flask, with the supernatant liquid which develops on standing being removed, the latter comprising a large proportion of the liquid vehicle present. The desired ether or other solvent is now added to the remaining dispersion.

As the next step in the preparation, phosphine gas is slowly bubbled into the alkali metal-containing mixture until reaction is complete. The reaction is exothermic, and during addition of the $PH_3$, the contents of the flask or other reaction vessel are cooled to a temperature at least below 50° C., and preferably below 25° C. The end of the reaction is indicated by the cessation of any further release of reaction heat. The $NaPH_2$ found, which is present in the system in the form of a grey-green slurry, can be used without further purification, though large portions, or indeed all, of the solvent employed can be separated out by conventional extraction or other known methods, if desired.

By passing in a slight excess of the phosphine reactant into the sodium or other alkali metal dispersion, it is possible to get yields of the desired alkali metal phosphide in excess of 80% when employing methoxy-polyether solvents of the preferred class. Representative materials in this group include (mono) ethylene glycol dimethyl ether, the various di-, tri-, and higher polyethylene glycol dimethyl ethers, 1-methoxy-5-ethoxypentane and the like. Using aromatic hydrocarbon solvent such as xylene or toluene, for example, the yields obtained may be expected to average about 50%, while with mineral spirits, yields of 10–20% have been obtained, the latter being typical of the yields which can be expected with aliphatic hydrocarbon solvents.

It is believed that the nature of this invention will be more fully understood from a consideration of the following examples which illustrate the invention in various of its embodiments.

*Example 1.*—In this operation, $NaPH_2$ was prepared in a yield of 90% by the reaction of $PH_3$ with finely dispersed sodium in diethylene glycol dimethyl ether.

In carrying out this preparation, 23 g. of sodium were melted under diethylene glycol dimethyl ether and allowed to cool. The resulting clean silver-appearing sodium marbles were then transferred to a steel mixing vessel containing 200 ml. of odorless mineral spirits and fitted with a thermometer, inlet tube and condenser. The mixture was heated to 105–110° C. with a Glas-Col mantle while an inert atmosphere of argon was maintained over the mixture. The heated material was then beaten at high speed for ten minutes so as to effect a fine dispersion of the sodium, after which the contents of the mixer were allowed to cool to room temperature. The dispersion was transferred to a 1-liter, 3-neck flask fitted with stirrer, condenser and inlet tube. After standing for 30 minutes, 125 ml. of supernatant solvent were removed and replaced with 200 ml. of diethylene glycol dimethyl ether. The flask was maintained at 20° C. with a water bath, while $PH_3$ gas was admitted at a rate of 100 cc. per minute. After 15 minutes, the color of the mixture began to change as the mixture thickened. Thereafter, large particles of grey-green material precipitated, and, with continued passage of $PH_3$, these particles appeared to undergo further reaction. At the end of 4½ hours, when a total of 48 grams of $PH_3$ had been used, no further heat was evolved and the reaction was deemed complete. The mixture now had the appearance of a smooth slurry. Analysis of the product, as determined by hydrolysis and measuring the $PH_3$ produced, showed a yield of $NaPH_2$ in excess of 90%. In another preparation, wherein ethylene glycol dimethyl ether was used in lieu of the corresponding diglycol product, a similarly high yield was obtained.

*Example II.*—In this operation, the preparation described above in Example I was repeated under essentially the same contitions but with the reaction being effected in a xylene solvent instead of diethylene glycol dimethyl ether. Here the yield of $NaPH_2$ was of the order of 50%. Similarly, in a like preparation with an aliphatic hydrocarbon solvent (Amsco odorless mineral spirits) the yield was 12%.

We claim:

A method of preparing $NaPH_2$ which comprises: placing a Na metal in a liquid hydrocarbon solvent having a boiling point in excess of the melting point of the said metal; applying sufficient heat thereto to melt the said metal while agitating vigorously whereby to form a dispersion of sodium in the said liquid hydrocarbon solvent; removing excess solvent therefrom; adding a polyether having at least one terminal methoxy group to the remaining material; and bubbling $PH_3$ gas into the said polyether in stoichiometric excess relative to the said sodium while maintaining the temperature of the reaction mixture below about 50° C. whereby to form said $NaPH_2$.

References Cited in the file of this patent

UNITED STATES PATENTS

| | | |
|---|---|---|
| 2,534,533 | Schlesinger | Dec. 19, 1950 |
| 2,545,633 | Schlesinger et al. | Mar. 20, 1951 |

OTHER REFERENCES

Albers et al.: Berichte der Deutschen Chemisches Gesellschaft, vol. 76, 1943, p. 23.

Mellor's Compresensive Treatise on Inorganic and Theoretical Chemistry," Longmans, Green and Co., vol. VIII, pp. 817 and 834, 1928.

"The Alkali Metal Phosphides, I. Reaction of Alkali Metals and White Phosphorus in Liquid Ammonia," by E. C. Evers, Journal of the American Chemical Society, vol. 73, May 1951, pp. 2038–40.